United States Patent
Nishimura et al.

(10) Patent No.: US 6,578,381 B2
(45) Date of Patent: Jun. 17, 2003

(54) FINE GLASS PARTICLE CONTAINING EMBEDDED OXIDE AND PROCESS FOR PRODUCING THE SAME

(75) Inventors: Keiichi Nishimura, Saitama (JP); Takashi Fujii, Saitama (JP); Kazuhiro Yubuta, Saitama (JP); Sadao Shinozaki, Saitama (JP)

(73) Assignees: Nisshin Seifun Group Inc., Tokyo (JP); Nisshin Engineering Inc., Tokyo (JP)

(*) Notice: Subject to any disclaimer, the term of this patent is extended or adjusted under 35 U.S.C. 154(b) by 0 days.

(21) Appl. No.: 10/018,432

(22) PCT Filed: Apr. 19, 2001

(86) PCT No.: PCT/JP01/03347

§ 371 (c)(1),
(2), (4) Date: Dec. 20, 2001

(87) PCT Pub. No.: WO01/81260

PCT Pub. Date: Nov. 1, 2001

(65) Prior Publication Data

US 2003/0013594 A1 Jan. 16, 2003

(30) Foreign Application Priority Data

Apr. 20, 2000 (JP) ........................................ 2000-119542

(51) Int. Cl.[7] .............................................. G03B 37/00
(52) U.S. Cl. ............................ 65/21.1; 65/21.4; 65/45; 65/DIG. 11; 427/452; 427/567; 427/569; 427/574; 427/583; 427/586; 264/482; 264/483
(58) Field of Search .............................. 65/21.1, 21.4, 65/45, DIG. 11; 427/452, 567, 569, 574, 583, 586; 264/482, 483

(56) References Cited

U.S. PATENT DOCUMENTS

| 5,489,449 A | 2/1996 | Umeya et al. |
| 5,536,485 A | 7/1996 | Kume et al. |
| 6,024,915 A | 2/2000 | Kume et al. |

FOREIGN PATENT DOCUMENTS

| JP | A 3-75302 | 3/1991 |
| JP | A 4-160023 | 6/1992 |
| JP | A 6-127977 | 5/1994 |
| JP | A 7-53268 | 2/1995 |
| JP | A 7-54008 | 2/1995 |

OTHER PUBLICATIONS

Machine translation of JP 06–127977.*

* cited by examiner

*Primary Examiner*—Michael Colaianni
(74) *Attorney, Agent, or Firm*—Young & Thompson

(57) ABSTRACT

The oxides-enclosed fine glass particles are arranged such that two or more pieces of at least two kinds of enclosing particles, which comprise oxides, double oxides, or salts of oxyacids, or double oxides or double salts thereof, are enclosed in each of the fine glass particles. The fine particles can be easily manufactured by mixing a powder material of glass with a powder material of oxides which comprise oxides, double oxides, or salts of oxyacids, or double oxides or double salts thereof that are not made to glass; converting the thus obtained mixture of the materials into a mixture in a vapor-state by supplying the thermal plasma thereto; and quickly cooling the mixture in the vapor-state. Highly-scattered fine particles of oxides can be easily obtained from the fine particles, and thus a plurality of kinds of fine particles of oxides can be evenly and uniformly mixed in a small amount with a mother material without being unevenly scattered.

8 Claims, 3 Drawing Sheets

FINE GLASS PARTICLE CONTAINING EMBEDDED OXIDE AND PROCESS FOR PRODUCING THE SAME

TECHNICAL FIELD

The present invention relates to oxides-enclosed fine glass particles in each of which fine particles comprising oxides and salts are enclosed, and to a method of manufacturing the same.

BACKGROUND OF ART

Conventionally, mixed particles, in which particles of a mother material are mixed with fine particles of auxiliary agents or additives such as oxides and salts, or a mixture of the mixed particles with binders, are used in the field of mechanical components having high hardness and high accuracy such as cutting tools, dies, and bearings; in the field of materials used for, for example, engine valves which require the resistance to wear and abrasion at a high temperature; in the field of functional materials such as capacitors and sensors; and in the field of electric insulating materials used for, for example, various types of electric insulating parts When, for example, a sintered body is produced, particles of a sintering mother material are mixed with fine particles of oxides and salts that act as sintering auxiliary agents and with fine g ass particles, and further mixed with binders when necessary, thereby obtaining a mixture thereof. Then, a green body is obtained by molding the thus obtained mixture in a predetermined shape, and the resultant green body is sintered at a given temperature under a given pressure, It is preferable here to uniformly scatter fine sintering auxiliary agents in an amount as small as possible. However, it is more difficult to uniformly scatter fine sintering auxiliary agents in a small amount and to mix them with particles of a sintering mother material because the fine sintering auxiliary agents are more liable to agglomerate.

To cope with this problem, there are manufactured coated particles in such a manner that particles of a sintering material such as particles of inorganic materials including diamond particles and ceramics particles, and metal particles are used as core particles, and the core particles are previously coated evenly and uniformly with various types of metal materials and inorganic materials such as ceramics, oxides, carbides and nitrides that act as the sintering auxiliary agent.

These coated particles are used to improve the bonding strength and the denseness between different types of ceramics and between different types of metals in sintered bodies and thermally sprayed parts.

Unexamined Japanese Patent Application Publication JP 3-75302 A, and JP 7-53268 A to JP 7-54008 A filed by the present applicant, for example, disclose coated particles comprising particles of an inorganic material or a metal material having an average particle size of 0.1 $\mu$m–100 $\mu$m, each of the particles being covered with superfine particles of the same type or a different type of an inorganic material or a meal material each having an average particle size of 0.005 $\mu$m–0.5 $\mu$m, and also disclose a method of manufacturing the coated particles the method of manufacturing the coated particles disclosed in these publications, after superfine particles are created by a vapor-phase method such as a thermal plasma method, core particles to be covered are introduced into the flow of the thus created superfine particles or into a space in which the superfine particles are created; and both the superfine particles and the core particles are caused to come into contact with one another in a flowing state; and thereby the surface of each core particle is covered with the superfine particles.

While the coated particles disclosed in these publications are useful in the manufacture of sintered bodies, it is difficult to obtain coated particles each of which is simultaneously covered with fine particles of a plurality of types of sintering auxiliary agents.

Accordingly, there is required a method of evenly and uniformly mixing the particles of a sintering mother material with a small amount of fine particles of a plurality of types of sintering auxiliary agents, optionally or when necessary.

Incidentally, fine particles, and in particular, fine particles of oxides and salts having a particle size of 1 $\mu$m or less are widely used as an auxiliary agent such as a sintering auxiliary agent or as an additive, as described above. However, the auxiliary agent and the additive exert their performance by their nature when they have a particle size smaller than that of a mother material and are contained in the mother material in a small amount Thus, fine particles used for this application must be evenly and uniformly mixed with the mother material in a well scattered state without agglomerating in the mother material.

For this purpose, conventionally, when a plurality of types of oxide powders are mixed with a mother material powder, each oxide powder is made as fine as possible and mechanically mixed with the mother material powder so as to keep the oxide powder in a highly scattered state. However, since a fine oxide powder has a stronger agglomerating force, even if the powder is mixed with a mother material powder macroscopically, a multiplicity of agglomerated powder composed of a single component is scattered microscopically. As a result, there arises a problem that an ideally scattered state cannot be obtained. Further, it is very difficult to scatter each of the agglomerated bodies of the oxide powder that have agglomerated once in a mixture by pulverization or grinding.

The fine particles of the auxiliary agent powder are liable to agglomerate in a state as they are, and moreover they are added in a small amount in many cases, as described above. Thus, when the fine particles of the auxiliary agent powder are only simply mixed with the particles of the mother material powder, they are unevenly distributed. Accordingly, it is difficult to evenly distribute the fine particles of the auxiliary agent powder in the mother material powder for uniform mixing.

DISCLOSURE OF INVENTION

Accordingly, when particles of a mother material powder are mixed with a small amount of fine particles of an auxiliary agent powder, there is eagerly required a method and an apparatus for not unevenly distributing but evenly scattering the small amount of the fine particles of the auxiliary agent powder for uniform mixing.

A first object of the present invention is to solve the problem of the above conventional technology by providing oxides-enclosed fine glass particles from which highly scattered fine particles of oxides can be easily obtained and in which a plurality of kinds of fine particles of oxides can be evenly and uniformly mixed with a small amount of a mother material without being scattered unevenly.

A second object of the present invention is to provide a method of manufacturing oxides-enclosed fine glass particles capable of easily manufacturing the novel oxides-enclosed fine glass particles.

As a result of diligent studies performed by the inventors for solving the above problems, the inventors have found that highly scattered fine particles of oxides can be easily obtained by preliminarily making fine particles in each of which oxides are enclosed in such a manner that a plurality of pieces of fine particles of oxides are scattered and enclosed in each of fine glass particles acting similarly as an auxiliary agent, and by pulverizing the thus obtained oxides-enclosed fine glass particles when necessary, contrary to a conventional technical common knowledge that a powder material of oxides is pulverized and mechanically mixed with a powder mother material; that even if fine particles of oxides are mixed with a mother material, they can be evenly and uniformly scattered therein without being agglomerated and without being unevenly scattered; and that glass is most suitable as a material in which the fine particles of oxides are enclosed because the glass improves the scattering property of fine particles themselves in which oxides are enclosed. Accordingly, the present invention has been completed based on the above knowledge.

That is, oxides-enclosed fine glass particles, characterized in that two or more pieces of at least two kinds of enclosing particles, which comprise oxides, double oxides, or salts of oxyacids, or double oxides or double salts thereof, are enclosed in each of fine glass particles.

It is preferable that an average particle size of the fine glass particles is 0.05–1 $\mu$m, and the average particle size of the enclosing fine particles is 0.01 $\mu$m–0.3 $\mu$m and less than one half of the average particle size of the fine glass particles.

It is preferable that the oxides, double oxides, or salts of oxyacids, or double oxides or double salts thereof, which constitute the enclosing fine particles, are at least two members selected from the group consisting of titanium oxide, zirconium oxide, calcium oxide, silicon oxide, aluminum oxide, silver oxide, iron oxide, magnesium oxide, manganese oxide, yttrium oxide, cerium oxide, samarium oxide, beryllium oxide, chromium oxide, barium oxide, vanadium oxide, barium titanate, lead titanate, lead titanate zirconate, lithium aluminate, yttrium vanadate, calcium phosphate, calcium zirconate, iron titanium oxide, cobalt titanium oxide, and barium stannate.

Further, a method of manufacturing oxides-enclosed fine glass particles according to a second aspect of the present invention is characterized by comprising the steps of mixing a powder material of glass with a powder material of oxides which comprises oxides, double oxides, or salts of oxyacids, or double oxides or double salts thereof that are not made to glass; converting the thus obtained mixture of the powder materials into a mixture in a vapor-state by supplying thermal plasma to the powder materials; and quickly cooling the mixture in the vapor-state, thereby manufacturing oxides-enclosed fine glass particles in each of which two or more pieces of at least two kinds of enclosing particles, which comprise oxides, double oxides, or salts of oxyacids, or double oxides or double salts thereof, are enclosed.

It is preferable that an average particle size of the fine glass particles be 0.05–1 $\mu$m and that the average particle size of the enclosing fine particles be 0.01 $\mu$m–0.3 $\mu$m and less than one half of the average particle size of the fine glass particles.

It is preferable that the oxides, double oxides, or salts of oxyacids, or double oxides or double salts thereof, which constitute the powder material of oxides are at least two members selected from the group consisting of titanium oxide, zirconium oxide, calcium oxide, silicon oxide, aluminum oxide, silver oxide, iron oxide, magnesium oxide, manganese oxide, yttrium oxide, cerium oxide, samarium oxide, beryllium oxide, barium titanate, lead titanate, lead titanate zirconate, lithium aluminate, yttrium vanadate, calcium phosphate, calcium zirconate, iron titanium oxide, cobalt titanium oxide, barium stannate, chromium oxide, barium oxide, and vanadium oxide.

It is preferable that an average particle size of the powder material of glass is 0.5 $\mu$m–10 $\mu$m, and the average particle size of the powder material of oxides is 0.1 $\mu$m–5 $\mu$m.

It is preferable that the temperature of the thermal plasma is higher than a boiling point of the powder material of glass and the boiling point of the powder material of oxides and that an atmosphere in the thermal plasma is an atmosphere equal to or less than an atmospheric pressure.

It is preferable that the atmosphere in the thermal plasma is 25 kPa–80 kPa and that an atmosphere in which the mixture in the vapor-phase is quickly cooled is an inert atmosphere, an oxidizing atmosphere, or a reducing atmosphere.

BEST MODE FOR CARRYING OUT THE INVENTION

Fine particles of oxides-enciosed-glass and a method of manufacturing the same according to the present invention will be described below in detail based on preferable embodiments shown in the accompanying drawings.

Figure 1:
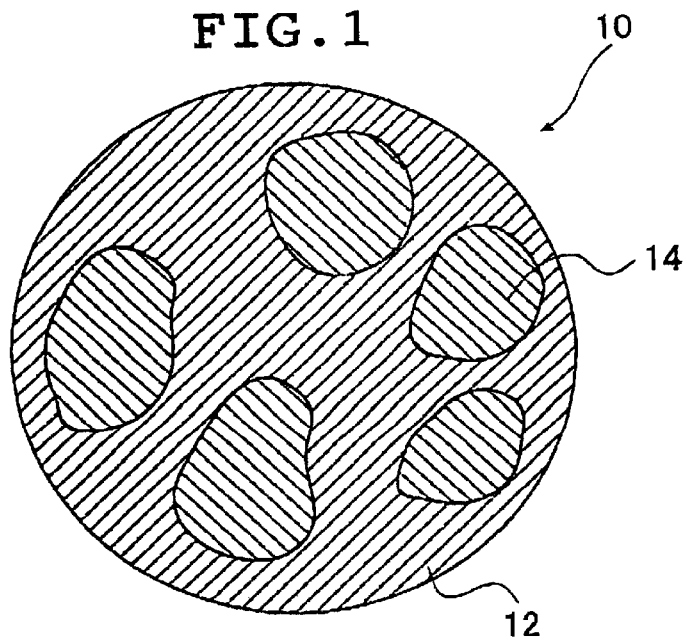
FIG. 1 is a schematic sectional view showing the arrangement of an example of oxides-enclosed fine glass particles of the present invention.

FIG. 1 is a schematic sectional view showing the arrangement of an example of an oxides-enclosed fine glass particle of a first aspect of the present invention.

As shown in the figure, each of oxides-enclosed fine glass particles 10 (hereinafter, also simply referred to as "fine glass particles") includes a glass section 12 mainly composed of glass and a plurality of enclosing fine particles 14 that are enclosed in the glass section 12. Moreover, the plurality of enclosing fine particles 14 are basically scattered loosely and enclosed in the fine glass particle 10 without entirely agglomerating to form a single agglomerated body. As a result, the oxides-enclosed fine glass particles 10 of the present invention are entirely different from covered fine particles each of which is composed of a single fine particle or an agglomerated body of a plurality of fine particles the surface of which is covered with glass superfine particles or a glass film.

While the average particle size of the oxides-enclosed fine glass particles 10 is not particularly limited as long as the size is fine, fine particles having an average particle size in the range of 0.05 µm–1 µm are preferable and fine particles having an average particle size in the range of 0.1 µm–0.5 µm are more preferable. While the distributed size of the oxides-enclosed fine glass particles 10 is not also particularly limited, it is preferable that particle sizes thereof be less dispersed, that is, the distributed size has a narrower half value width.

Further, the shape of the oxides-enclosed fine glass particles 10 is not particularly limited and some of the enclosing fine particles 14 may protrude externally from the fine glass particles 10. However, it is preferable that the oxides-enclosed fine glass particles 10 are formed in an approximately spherical state from the view point of improving, for example, the scattering property of the fine glass particles 10 themselves.

The main component of the glass section 12 into which the enclosing fine particles 14 are enclosed is amorphous glass. Glass is an amorphous solid obtained by solidifying a liquefied or gasified crystalline solid at a temperature equal to or less than a glass transition temperature without crystallizing it. However, the glass used in the present invention is liable to be broken or crushed as compared with fine particles of oxides. Since the glass section 12 is mainly composed of the glass, the glass can be easily broken by subjecting the oxides-enclosed fine glass particles 10 to an appropriate crushing process. As a result, the enclosing fine particles 14, which are enclosed in the fine glass particles 10, can be highly scattered in the glass powder.

Further, glass having a certain degree of size (1 µm or more) is liable to be crushed, is amorphous, and has no difference in easiness of breaking according to directions. Thus, fine particles having a uniform particle size (particle sizes are distributed in a narrow width) can be obtained by appropriately crushing the oxides-enclosed fine glass particles 10.

All the types of conventionally known inorganic glass, for example, silicate glass such as silica glass, soda-lime glass, etc., practically-used glass such as borosilicate glass, etc. as well as glass porcelain, etc. can be exemplified as the glass mainly constituting the glass section 12, and more preferably used are silicate glass and borosilicate glass.

The ratio of the glass section 12 which occupies in each of the oxides-enclosed fine glass particles 10 is not particularly limited as long as the enclosing fine particles 14 can be enclosed in the glass section 12. However, the occupying ratio of the glass section 12 is preferably 30 vol %–90 vol %, more preferably 40 vol %–75 vol %, and further more preferably 50 vol %–60 vol %.

Further, a plurality of the enclosing fine particles 14 are enclosed in each of the oxides-enclosed fine glass particles 10 The enclosing fine particles 14 comprise oxides, double oxides, salts of oxyacids, double oxides or double salts thereof.

In the present invention, the oxides, double oxides, or salts of oxyacids, or the double oxides or double salts thereof (hereinafter, also referred to simply as "oxides" as a whole), which constitute the enclosing fine particles 14, are not particularly limited, and any of the oxides, double oxides, salts of oxyacids, and double salts may be used. That is, they may be appropriately selected according to the application thereof in which the oxides-enclosed fine glass particles 10 are used in a crushed state or used as they are.

Exemplified as the enclosing fine particles 14 are oxides such as titanium oxide, zirconium oxide, calcium oxide, silicon oxide, aluminum oxide, silver oxide, iron oxide, magnesium oxide, manganese oxide, yttrium oxide, cerium oxide, samarium oxide, beryllium oxide, chromium oxide, barium oxide, vanadium oxide, etc., double oxides such as barium titanate, lead titanate, lithium aluminate, yttrium vanadate, calcium phosphate, calcium zirconate, lead titanate zirconate, iron titanium oxide, cobalt titanium oxide, barium stannate, etc, and salts of oxyacids, etc.

Note that the plurality of enclosing fine particles 14 which are enclosed in a single oxides-enclosed fine glass particle 10 may be of the same type or may be of a different type.

Further, the enclosing fine particles 14 may be partly formed in a glass state.

The average particle size of the enclosing tine particles 14 is not particularly limited and may be appropriately selected according to the size of the oxides-enclosed fine glass particles 10 and to the application thereof in which the oxides-enclosed fine glass particles 10 are used in a crushed state or used as they are. However, the average size of the enclosing fine particles 14 is preferably 0.01 µm–0.3 µm and less than one-half of the average particle size of the fine glass particles, and more preferably within the range of 0.05 µm–0.2 µm.

Further, the shape of the oxides-enclosed fine glass particles 10 is not particularly limited, and they may be formed in any shape.

As described above, the oxides-enclosed fine glass particles 10 themselves of the present invention are fine with a particle size of 0.05 µm–1 µm.

Further, since the plurality of types of the oxides having an average particle size of, for example, 0.01 µm–0.3 µm are highly scattered and held in the oxides-enclosed fine glass particles themselves, scattering of the fine glass particles need only be considered. Even if some of the fine glass particles agglomerate, they are more scattered as compared with conventional fine particles as a result of agglomeration of a multiplicity of components.

Accordingly,the oxides-enclosed fine glass particles of the present invention are very suitable when it is desired to scatter as much as possible a plurality of components (a plurality of kinds of components) such as a sintering auxiliary agent in a small amount.

Further, fine particles obtained by pulverizing the oxides-enclosed fine glass particles 10 of the present invention are highly scattered, even if they are mixed with particles of a sintering mother material, as compared with the fine particles obtained by the conventional method. Thus, there is an advantage that the strength of a sintered body is increased and that the amount of the sintering auxiliary agent to be mixed is small.

The oxides-enclosed fine glass particles according to the present invention are basically arranged as described above.

Next, a method of manufacturing oxides-enclosed fine glass particles according to a second aspect of the present invention will be described below with reference to FIGS. 2 and 3.

Figure 2:
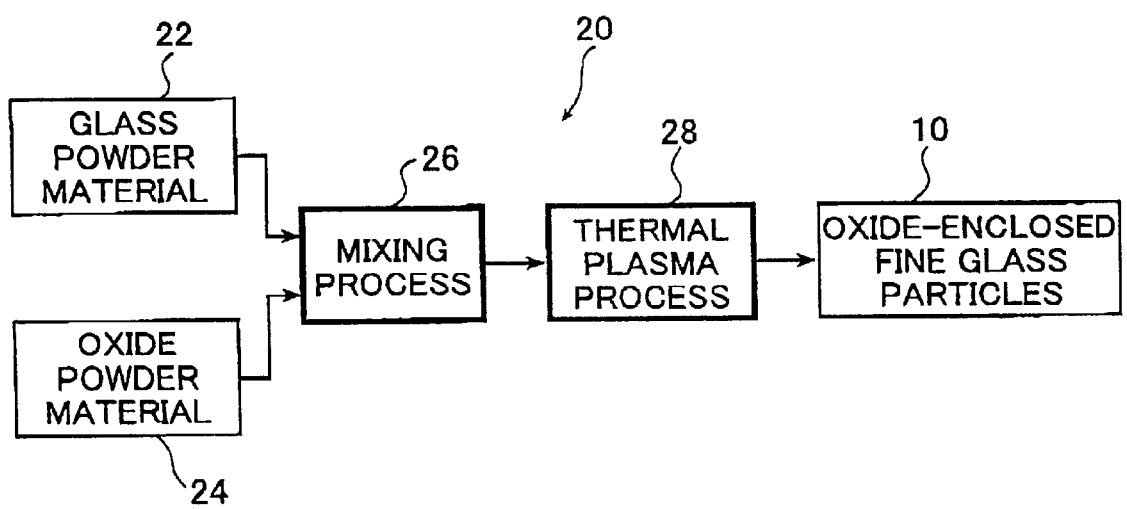
FIG. 2 is a block diagram showing an example of a method of manufacturing the oxides-enclosed fine glass particles of the present invention.

FIG. 2 is a block diagram showing an example of the method of manufacturing oxides-enclosed fine glass particles according to the second aspect of present invention. FIG. 3 is a sectional view shown by lines of an example of an oxides-enclosed fine glass particles manufacturing apparatus for performing a thermal plasma treatment in the method of manufacturing oxides-enclosed fine glass particles of the present invention shown in FIG. 2. The method of manufacturing oxides-enclosed fine glass particles of the present invention is not limited to the example shown in these figures.

As shown in FIG. 2, an oxides-enclosed fine glass particles manufacturing process 20 for performing the method of manufacturing oxides-enclosed fine glass particles of the present invention comprises a mixing treatment step 26 for mixing a powder material of glass 22 for forming the glass section 12 with a powder material of oxides 24 for forming the enclosing fine particles 14, and a thermal plasma treatment step 28 for subjecting a mixture of the powder material of glass 22 and the powder material of oxides 24 obtained at the mixing treatment step 26 to thermal plasma treatment and for enclosing the plurality of enclosing fine particles 14 pulverized from the powder material of oxides 24 in the glass section 12 obtained from the powder material of glass 22 thereby manufacturing the oxides-enclosed fine glass particles 10 of the present invention.

The powder material of glass 22 used in the present invention is glass which is supplied to constitute the glass section 12 for enclosing the enclosing fine particles 14 and is not particularly limited as long as it is the powder material of glass for the aforementioned glass section 12. The average particle size of the powder material of glass 22 is not particularly limited. When, however, the average particle size of the oxides-enclosed fine glass particles 10 is within the range of, for example, 0.05 $\mu$m–1 $\mu$m, it is preferably within the range of 0.5 $\mu$m–10 $\mu$m, and it is more preferable that the particle size of all the particles thereof is within the range of 10 $\mu$m or less.

The powder material of oxides 24 used in the present invention are oxides, double oxides, or salts of oxyacids, or double oxides or double salts thereof which are supplied to constitute the enclosing fine particles 14 which are enclosed in the fine glass particles 10, and is not particularly limited so long as it is a powder material of the aforementioned oxides, double oxides, or salts of oxyacids. The average particle size of the powder material of oxides 24 is not particularly limited. When, however, the average particle size of the enclosing fine particles 14 is within the range of 0.01 $\mu$m–0.3 $\mu$m, the average particle size of the powder material of oxides 24 is preferably within the range of 0.1 $\mu$m–5 $\mu$m, and it is more preferable that the particle size of all the particles thereof is within the range of 5 $\mu$m or less.

At the mixing treatment step 26 shown in FIG. 2, the glass powder particles 22 arranged as the glass section 12 is mixed with the powder material of oxides 24 arranged as the enclosing fine particles 14. While any mixing treatment may be used at the mixing treatment step 26 so long as both the powder materials 22 and 24 can be mixed with each other, it is preferable to uniformly mix both the powder materials 22 and 24. While a mixer used at the mixing treatment step 26 is not particularly limited, conventionally known mixers such as a high speed shearing/impacting type mixer and an attriting type mixer which perform dry mixing and a ball mill which performs wet mixing can be exemplified.

The mixture of the powder materials obtained at the mixing treatment step 26 is supplied to the thermal plasma treatment step 28.

Figure 3:
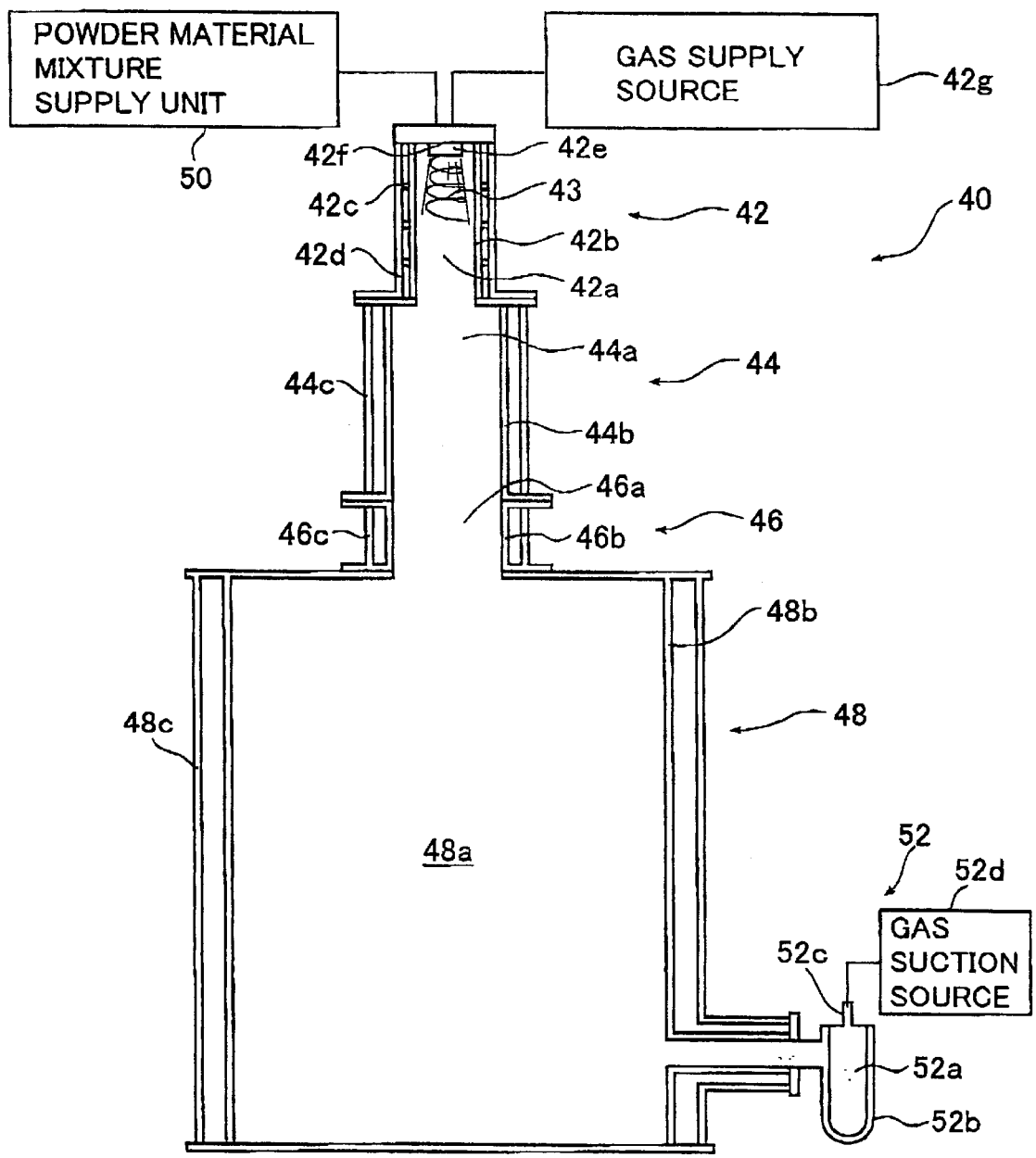
FIG. 3 is a sectional view shown by lines of an embodiment of an oxides-enclosed fine glass particles manufacturing apparatus for performing a thermal plasma treatment in the method of manufacturing the oxides-enclosed fine glass particles of the present invention shown in FIG. 2.

The thermal plasma treatment step 28 is performed in the oxides-enclosed fine glass particles manufacturing apparatus shown in FIG. 3.

The oxides-enclosed fine glass particles manufacturing apparatus 40 shown in FIG. 3 includes a plasma torch 42 having a plasma chamber 42a, a double quartz tube 44, a double cooling tube 46, a quick cooling tube 48, a powder materials mixture feeder 50, and a product collecting section 52.

The plasma torch 42 includes a quartz tube 42b constituting the plasma chamber 42a in which thermal plasma (plasma flame) 43 is generated, a radio-frequency oscillation coil 42c mounted on the outside of the quartz tube 42b, an outside cooling tube 42d disposed on the outside of the radio-frequency oscillation coil 42c, a gas ejection port 42e disposed in the upper portion of the quartz tube 42b for ejecting plasma gas in three ejecting directions, that is, a tangential direction, an axial direction, and a radial direction, and a supply port 42f for supplying the mixture of the powder materials to the thermal plasma 43 generated in the plasma chamber 42a While the plasma torch 42 comprises a double tube composed of the quartz tube 42b and the outside tube 42d with the coil 42c interposed therebetween, the present invention is not limited thereto. That is, the plasma torch 42 may include the coil 42c wound around the outside thereof or may be arranged as a multiple tube composed of three or more tubes, and the size of the plasma torch 42 is not particularly limited. Further, the ejecting directions of the plasma gas ejected from the gas ejection port 42e are not limited to the three directions, and the plasma gas may be ejected in various directions.

The gas ejection port 42e is connected to one or a plurality of gas supply sources 42g located at an-external upper position of the plasma torch 42.

When plasma gas is supplied from the gas supply sources 42g to the gas ejection port 42e, the plasma gas is ejected from the gas ejection port 42e into the plasma chamber 42a in the three directions. The radio-frequency oscillation coil 42c to which a radio-frequency voltage is applied from a radio-frequency (RF) power supply converts the ejected plasma gas into plasma and the thermal plasma 43 is formed in the plasma chamber 42a of the plasma torch 42.

Note that the plasma gas supplied from the gas ejection port 42e is limited to a rare gas such as argon gas or helium gas, hydrogen gas, nitrogen gas, oxygen gas, and gas mixtures thereof. The amount of the gas supplied from the gas ejection port 42e may be appropriately selected according to the size of the plasma chamber 42a, the properties of the thermal plasma 43, the amount of the mixture of the powder materials to be treated.

Further, the levels of the frequency, voltage, and current of the radio-frequency applied to the radio-frequency oscillation coil 42c are not particularly limited and may be appropriately selected according the properties of the thermal plasma 43 such as its temperature.

The temperature of the thus generated thermal plasma 43 must be equal to or higher than the boiling points of the powder material of glass 22 and the powder material of oxides 24 because the mixture of these powder materials must be converted into a vapor-phase. Note that it is preferable that the temperature of the thermal plasma 43 be as high as possible because the thermal plasma 43 at a higher temperature can facilitate conversion of the mixture of both the powder materials 22 and 24 into the vapor-phase. However, the temperature of the thermal plasma 43 is not particularly limited. For example, it is possible to set the temperature of the thermal plasma 43 at 6000° C. or more as a specific example. In contrast, the upper limit of the temperature of the thermal plasma 43 is also not limited.

While it is difficult to determine the upper limit temperature because its measurement is difficult, it is conceived that the upper limit temperature theoretically reaches about 1000° C.

Further, while not particularly limited, the atmosphere of the thermal plasma 43 is preferably at the atmospheric pressure or less, that is, it is preferably an atmosphere at the atmospheric pressure or under reduced pressure. While the atmosphere in the thermal plasma 43 at the atmospheric pressure or less is not particularly limited, it is preferably at 25 kPa–80 kpa.

The supply port 42f of the mixture of the powder materials is also connected to the powder materials mixture feeder 50 located at an external upper position of the plasma torch 42.

The mixture of the powder materials from the powder materials mixture feeder 50 is carried by a carrier gas and introduced into the thermal plasma through the supply port 42f. The carrier gas used for the mixture of the powder materials is limited to a rare gas such as argon gas or helium gas, hydrogen gas, nitrogen gas, oxide as, and gas mixtures thereof. Note that the plasma gas or a part thereof (one, two or more of gases before they are mixed) may be used as the carrier gas for the mixture of the powder materials.

The mixture of the powder materials introduced into the thermal plasma 43 as described above is heated by the heat generated by the thermal plasma 43 and vaporized in a moment. Thus, the powder material of glass 22 and the powder material of oxides 24 in the mixture exist together in the vapor-phase in the thermal plasma 43. The amount of the mixture of the powder materials supplied from the supply port 42f and the type and amount of the carrier gas for carrying the mixture of the powder materials are not particularly limited and may be appropriately selected according to the properties of the thermal plasma 43 and the amount of the mixture of the powder materials to be treated. However, it is preferable that the ratio of the powder material of glass 22 occupied in the mixture of the powder materials be 30 vol %–90 vol;, more preferably 40 vol %–75 vol %, and further more preferably 50 vol %–60 vol %.

The double quartz tube 44 is disposed under the plasma torch 42 and includes a quartz tube 44b having a diameter slightly larger than that of the quartz tube 42b of the plasma torch 42 and a cooling outer tube 44c disposed in the outside of the quartz tube 44b. The quartz tube 44b and the cooling outer tube 44c constitute a cooling chamber 44a. The cooling chamber 44a derives from the thermal plasma 43 the gas mixture of the powder material of glass 22 and the powder material of oxides 24 that have been converted into the vapor-phase by the thermal plasma 43 and primarily cools the mixed gas.

The double cooling tube 46 is disposed under the double quartz tube 44 and includes an inner tube 46b having approximately the same diameter as that of the quartz tube 44b of the double quartz tube 44 and a cooling outer tube 46c disposed in the outside of the inner tube 46b The inner tube 46b and the cooling outer tube 46c constitute a cooling chamber 46a which further cools secondarily the powder material of glass 22 and the powder material of oxides 24 in the vapor-phase, in a liquid-phase, or in a solid-phase that have been primarily cooled in the double quartz tube 44.

The quick cooling tube 48 is disposed under the double cooling tube 46 and includes an inner tube 48b having a diameter greatly larger than that of the quartz tube 46b of the double cooling tube 46 and a cooling outer tube 48c disposed in the outside of the inner tube 48b. The inner tube 48b and the cooling outer tube 48c constitute an enclosed-fine-particles creating chamber 48a which quickly cools the powder material of glass 22 and the powder material of oxides 24 in the vapor-phase, in the liquid-phase, or in the solid-phase that have been secondarily cooled in the double cooling tube 46 and creates the oxides-enclosed fine glass particles 10 of the present invention.

The mixture of the powder material of glass 22 and the powder material of oxides 24 in the vapor-phase or in the liquid-phase, which has been secondarily cooled in the double cooling tube 46, is quickly cooled in the enclosed-fine-particles creating chamber 48a of the quick cooling tube 48, and thereby the enclosing fine particles 14 are created as nucleate particles. The enclosing fine particles 14 are created from the mixture of the powder material of glass 22 and the powder material of oxides 24 in the vapor-phase or in the liquid-phase at a breath so that the particle size thereof is smaller than that of the powder material of oxides 24 in the solid state. More specifically, the particle size of the enclosing fine particles 14 is smaller than that of the particles of the powder material of oxides 24, and preferably one-tenth to one-several tenth that of the powder material of oxides 24. The periphery of each of the nucleate particles is covered with the glass formed from the powder material of glass 22 and several pieces of the nucleate particles covered with the glass gather, and finally the oxides-enclosed fine glass particles 10 of the present invention in which a plurality of the enclosing line particles 14 are enclosed in the glass section 12 are created.

The atmosphere in the enclosed-fine-particles creating chamber 48a of the quick cooling tube 48 for quickly cooling the mixture of the materials in the vapor-phase or in the liquid-phase is not particularly limited and any of an inert atmosphere, an oxidizing atmosphere, and a reducing atmosphere may be employed. The inert atmosphere, the oxidizing atmosphere, and the reducing atmosphere are not particularly limited. However, an inert gas atmosphere of at least one kind of, for example, argon gas, helium gas, and nitrogen gas or an atmosphere of these inert gases further containing hydrogen are exemplified. More specifically, exemplary atmospheres include a rare gas atmosphere such as an argon gas atmosphere or a helium gas atmosphere, an inert atmosphere such as a nitrogen gas atmosphere, or a gas atmosphere of argon gas or helium gas with nitrogen gas, a reducing atmosphere containing an inert gas and hydrogen gas, and an oxidizing atmosphere containing an inert gas and oxygen Further, the degree of the oxidizing property and the reducing property of these atmospheres are not also particularly limited.

While the double quartz tube 44, the double cooling tube 46, and the quick cooling tube 48 also have the double tube structure similar to that of the plasma torch 42, the present invention is not limited thereto and they may have a multi-tube structure having at least triple tubes, and further the size of these tubes are also not particularly limited.

The product collecting section 52 is a section for collecting the oxides-enclosed fine glass particles 10 of the present invention that have been created in the enclosed-fine-particles creating chamber 48a of the quick cooling tube 48, and includes a collection chamber 52a, a filter 52b, and a gas suction/exhaust port 52c. The collection chamber 52a is disposed at an external lower position of the quick cooling tube 48 and communicates with the enclosed-fine-particles creating chamber 48a; the filter 52b is disposed between the collection chamber 52a and the section communicating with the enclosed-fine-particles creating chamber 48a and separates oxides-enclosed fine glass particles 10 of the present invention from a fluidized gas such as the carrier gas and the plasma gas and collects the thus separated oxides-enclosed fine glass particles 10; and the gas suction/exhaust port 52c sucks the oxides-enclosed fine glass particles 10 of the present invention accommodated in the enclosed-fine-particles creating chamber 48a together with the fluidized gas and sucks and exhausts only the fluidized gas separated by the filter 52b.

The gas suction/exhaust port 52c is connected to a gas suction source 52d located at an external upper position of the product collecting section 52.

The fluidized gas sucked by the gas suction source 52d through the gas suction port 52c is composed of the plasma gas such as argon gas, nitrogen gas, hydrogen gas or oxygen gas which is used to generate the thermal plasma 43, and the carrier gas such as argon gas which carries the mixture of the powder materials. The fluidized gas is sucked from the enclosed-fine-particles creating chamber 48a into the product collecting section 52 together with the oxides-enclosed fine glass particles 10 of the present invention. The oxides-enclosed fine glass particles 10 of the present invention created in the enclosed-fine-particles creating chamber 48a are completely collected in the collection chamber 52a through the filter 52b, and only the fluidized gas separated by the filter 52b is exhausted from the gas suction/exhaust port 52c.

Although not shown, the powder materials mixture feeder 50 is used to cause the mixture of the powder materials, that is, the powder material of glass 22 and the powder material of oxides 24, which have been mixed by various mixers at the mixing treatment step 26, to be carried by the carrier gas such as argon gas and to feed the mixture into the thermal plasma 43 in the plasma torch 42 The powder materials mixture feeder 50 includes a storage chamber for storing the mixture of the powder materials, a mixing chamber for causing the mixture of the powder materials stored in the storage chamber to be carried by the carrier gas, a gas supply source for supplying the carrier gas into the mixing chamber, and the like.

The oxides-enclosed fine glass particles manufacturing apparatus 40 of the illustrated example includes the double quartz tube 44 and the double cooling tube 46 interposed between the plasma torch 42 for converting the mixture of the powder materials, that is, the powder material of glass 22 and the powder material of oxides 24 into the vapor-phase and the quick cooling tube 48 for quickly cooling the mixture of the powder materials in vapor-phase to create the oxides-enclosed fine glass particle 10 of the present invention so that the double quartz tube 44 and the double cooling tube 46 perform primary and secondary cooling as intermediate cooling in two stages. However, the present invention is not limited thereto and the apparatus 40 may not include these intermediate cooling devices at all, or may include a device for performing intermediate cooling in one stage, or may include devices for performing intermediate cooling in three or more stages.

The oxides-enclosed fine glass particles d manufacturing apparatus for performing the thermal plasma treatment step 28 of the oxides-enclosed fine glass particles manufacturing process of the present invention is basically arranged as described above. The operation of the apparatus and the thermal plasma treatment step 28 for manufacturing the oxides-enclosed fine glass particles of the present invention will be described below.

First, the mixture of the powder materials obtained at the mixing treatment step 26 is sent to the thermal plasma treatment step 28 and supplied to the powder materials mixture feeder 50 of the oxides-enclosed fine glass particles manufacturing apparatus 40 shown in FIG. 3. At this time, a given radio-frequency voltage is applied to the radio-frequency oscillation coil 42c of the plasma torch 42 in the oxides-enclosed fine glass particles manufacturing apparatus 40, the plasma gas supplied from the gas supply sources 42g is ejected from the gas ejection port 42e, and the thermal plasma 43 is generated and maintained in the plasma chamber 42a.

Subsequently, when the mixture of the powder materials is supplied from the powder materials mixture feeder 50 into the thermal plasma 43, which has been formed in the plasma chamber 42a, through the supply port 42f, the powder material of glass 22 and the powder material of oxides 24 in the mixture of the powder materials both evaporate to be converted into the vapor-phase.

Both the materials of the powder material of glass 22 and the powder material of oxides 24, which have been converted into the vapor-phase by the thermal plasma 43, fall from the plasma chamber 42a and get away from the thermal plasma 43, enter the cooling chamber 44a of the double quartz tube 44 and is cooled primarily therein, and further fall and enter the cooling chamber 46a of the double cooling tube 46, and cooled secondarily therein.

Subsequently, both the materials of the powder material of glass 22 and the powder material of oxides 24, which have been secondarily cooled to be converted into the vapor-phase or in part the liquid-phase, further fall and enter the enclosed-fine-particles creating chamber 48a of the quick cooling tube 48. The enclosed-fine-particles creating chamber 48a is located far from the thermal plasma and also has the size much larger than that of the cooling chamber 46a of the double cooling tube 46. Accordingly, both the materials of the powder material of glass 22 and the powder material of oxides 24, which have entered the enclosed-fine-particles creating chamber 48a and converted into the vapor-phase or in part the liquid-phase, are quickly cooled and solidified at a breath. Accordingly, the oxides-enclosed fine glass particles 10 of the present invention are created such that the enclosing fine particles 14, which are pulverized so as to have a particle size smaller than that of the powder material of oxides 24, that is, a particle size of, for example, one-tenth to one-several tenth that of the powder material of oxides 24, are used as the nucleate particles; the periphery of each of the nucleate particles is covered with the glass formed of the powder material of glass 22; several pieces of nucleate particles gather; and finally a plurality of enclosing fine particles 14 are enclosed in the glass section 12.

As described above, the oxides-enclosed fine glass particles 10 of the present invention each including a plurality of pieces of enclosing fine particles 14 that are enclosed in the glass section 12 can be obtained, wherein the enclosing fine particles 14 comprises the oxides, double oxides, or salts of oxyacids, or double oxides or double salts thereof which have been pulverized.

Note that the plurality of enclosing fine particles 14 that are enclosed in a single oxides-enclosed fine glass particle 10 may be of the same type or of a different type.

Further, the enclosing fine particles 14 may be partly formed in the glass state.

As described above, the method of manufacturing oxides-enclosed fine glass particles of the present invention is not limited to the intermediate cooling in the two stages that is performed by the double quartz tube 44 and the double cooling tube 46 and may employ intermediate cooling in a single stage or three or more stages.

The method of manufacturing oxides-enclosed fine glass particles of the present invention is basically arranged as described above.

EXAMPLES

The present invention will be described below in detail based on an example.

Example 1

A borosilicate powder material of glass 22 having an average particle size of 2 $\mu$m, and a powder material 24 composed of magnesium oxide powder having an average particle size of 0.6 μm and aluminum oxide powder having an average particle size of 1 μm were treated according to the oxides-enclosed fine glass particles manufacturing method 20 shown in FIG. 2 using the oxides-enclosed fine glass particles manufacturing apparatus 40 shown in FIG. 3. Then, oxides-enclosed fine glass particles 10, 50 vol % of each of which was occupied by a glass section 12, were manufactured by enclosing fine particles 14 composed of magnesium oxide and aluminum oxide in each glass fine powder A high speed stirring type mixer Hi-X (made by Nisshin Engineering Co., Ltd.) was used at the mixing treatment step 26 shown in FIG. 2

In the oxides-enclosed fine glass particles manufacturing apparatus 40 shown in FIG. 3, the quartz tube 42b of the plasma torch 42 had an inside diameter of 55 mm and a length of 220 mm; the quartz tube 44b of the double quartz tube 44 had an inside diameter of 120 mm and a length of 250 mm; the inner tube 46b of the double cooling tube 46 had an inside diameter of 120 mm and a length of 100 mm; and the inner tube 48b of the quick cooling tube 48 had an inside diameter of 400 mm and a length of 900 mm.

The powder material 24 of oxide magnesium and oxide aluminum and the borosilicate powder material of glass 22 were supplied such that the borosilicate powder material of glass 22 had a mixing ratio of 50 vol % in the mixture of the powder materials.

A radio-frequency of about 4 MHz and about 30 kvA was applied to the radio-frequency oscillation coil 42c of the plasma torch 42, and a gas mixture of argon gas (60 liters/min) and oxygen (20 liters/min) was used as a plasma gas ejected from the gas ejection port 42e. At that time, the atmosphere in the thermal plasma 43 formed in the plasma chamber 42a of the plasma torch 42 was under reduced pressure of about 40 kpa.

The mixture of the powder materials was carried by an argon gas (10 liters/min) that is a carrier gas supplied from the supply port 42f of the plasma torch 42 and supplied into the thermal plasma 43 at a ratio of 30 grams/hour.

Further, the atmosphere in the enclosed-fine-particles creating chamber 48a of the quick cooling tube 48 was a reducing atmosphere composed of argon gas containing oxygen.

The oxides-enclosed fine glass particles 10 could be manufactured with a good yield by the way described above The thus manufactured oxides-enclosed fine glass particles 10 were formed in an approximately spherical shape with an average particle size of 0.3 μm, the enclosing fine particles 14 enclosed in the fine glass particles had an average particle size of 0.05 μm, and the ratio of the glass section 12 in each of the oxides-enclosed tine glass particles 10 was 50 vol %.

Figure 4:
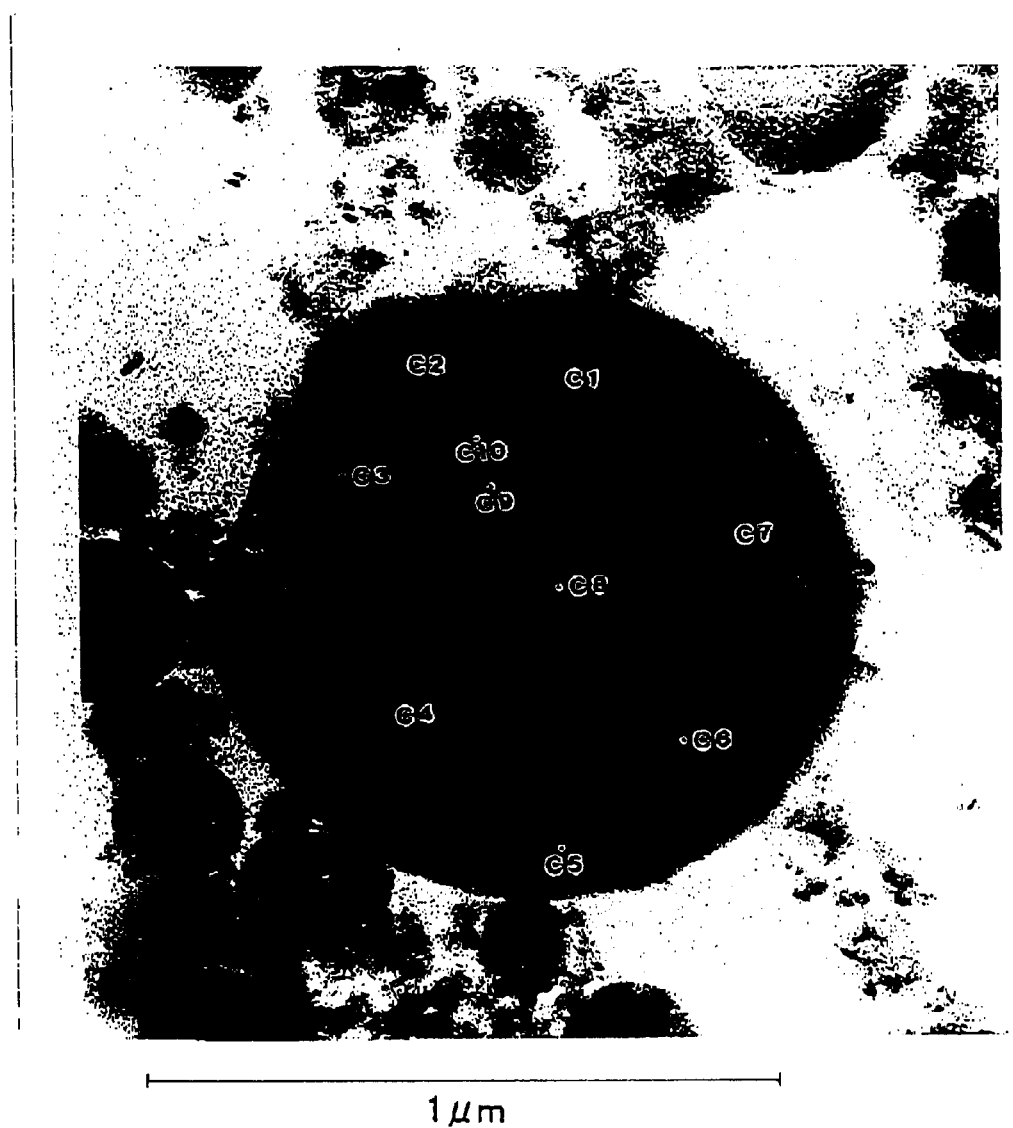
FIG. 4 is TEM photograph showing an example of the cross section of an oxides-enclosed fine glass particle obtained in Example 1 of the present invention.

FIG. 4 is a TEM photograph showing the cross section of an oxides-enclosed fine glass particle 10 obtained in Example 1.

It can be found from FIG. 4 that the oxides-enclosed fine glass particle is an approximately spherical fine particle having a plurality of enclosing fine particles that are enclosed in a glass section and that the plurality of enclosing fine particles are enclosed in the oxides-enclosed fine glass particle in an excellently scattered state.

While the oxides-enclosed fine glass particles and the manufacturing method of the same according to the present invention have been described above in detail, the present invention is by no means limited to the aforementioned example and it goes without saying that various improvements and modifications can be made within the range which does not depart from the gist of the present invention.

Industrial Applicability

As described above in detail, according to the oxides-enclosed fine glass particles of the present invention, one kind or a plurality of kinds of fine oxides having an average particle size of, for example, 0.01 μm–0.3 μm are held in each of the fine glass particles in a highly scattered state. Thus, highly scattered fine particles of oxides can be obtained by appropriately pulverizing them only in consideration of the scattering of the fine glass particles themselves. Further, even if some of the fine glass particles agglomerate, they are more scattered as compared with the conventional fine glass particles because of agglomeration of a multiplicity of components.

Further, since the fine glass particles themselves are fine with the average particle size of 0.05 μm–1 μm, highly scattered fine particles of oxides can be also obtained.

Accordingly, the oxides-enclosed fine glass particles of the present invention are very suitable for a case in which it is desired to scatter as much as possible a plurality of components (a plurality of types of components) such as a sintering auxiliary agent in a small amount. Further, since fine particles obtained by pulverizing the oxides-enclosed fine glass particles of the present invention are highly scattered as compared with the fine particles obtained by the conventional method, there is an advantage that the strength of a sintered body is increased and that the amount of the sintering auxiliary agent to be mixed is small.

Furthermore, the method of manufacturing oxides-enclosed fine glass particles of the present invention has an effect that the novel oxides-enclosed fine glass particles with the great advantages can be manufactured easily, and preferably with a good yield.

What is claimed is:

1. A method of manufacturing oxides-enclosed fine glass particles, characterized by comprising the steps of:

mixing a powder material of glass with a powder material of oxide which comprises oxides, double oxides, or salts of oxyacids, or double oxides or double salts thereof that are not made to glass;

converting the thus obtained mixture of the powder materials into a mixture in a vapor-state by supplying thermal plasma to the powder materials; and quickly cooling the mixture in the vapor-state, thereby manufacturing oxides-enclosed fine glass particles in each of which two or more pieces of at least two kinds of enclosing particles, which comprise oxides, double oxides, or salts of oxyacids, or double oxides or double salts thereof, are enclosed.

2. The method of manufacturing oxides-enclosed fine glass particles according to claim 1, wherein an average particle size of said fine glass particles is 0.05–1 μm, and the average particle size of said enclosing fine particles is 0.01 μm–0.3 μm and less than one half of the average particle size of said fine glass particles.

3. The method of manufacturing oxides-enclosed fine glass particles according to claim 1, wherein the oxides, double oxides, or salts of oxyacids, or double oxides or double salts thereof, which constitute said powder material of oxides are at least two members selected from the group consisting of titanium oxide, zirconium oxide, calcium oxide, silicon oxide, aluminum oxide, silver oxide, iron oxide, magnesium oxide, manganese oxide, yttrium oxide, cerium oxide, samarium oxide, beryllium oxide, barium titanate, lead titanate, lead titanate zirconate, lithium aluminate, yttrium vanadate, calcium phosphate, calcium zirconate, iron titanium oxide, cobalt titanium oxide, barium stannate, chromium oxide, barium oxide, and vanadium oxide.

4. The method of manufacturing oxides-enclosed fine glass particles according to claim 1, wherein an average particle size of said powder material of glass is 0.5 μm–10 μm, and the average particle size of said powder material of oxides is 0.1 μm–5 μm.

5. The method of manufacturing oxides-enclosed fine glass particles according to claim 1, wherein the temperature of said thermal plasma is higher than a boiling point of said powder material of glass and the boiling point of said powder material of oxides.

6. The method of manufacturing oxides-enclosed fine glass particles according to claim 1, wherein a pressure in an atmosphere in said thermal plasma is equal to or less than an atmospheric pressure.

7. The method of manufacturing oxides-enclosed fine glass particles according to claim 1, wherein a pressure in an atmosphere in said thermal plasma is 25 kPa–80 kPa.

8. The method of manufacturing oxides-enclosed fine glass particles according to claim 1, wherein an atmosphere in which the mixture in the vapor-phase is quickly cooled is an inert atmosphere, an oxidizing atmosphere, or a reducing atmosphere.

* * * * *